US008371855B1

(12) United States Patent
Gayles et al.

(10) Patent No.: US 8,371,855 B1
(45) Date of Patent: Feb. 12, 2013

(54) SHARING ELECTRONIC BOOKS

(75) Inventors: Edward J. Gayles, Tracy, CA (US); Laurent An Minh Nguyen, Los Altos, CA (US)

(73) Assignee: Amazon Technologies, Inc., Reno, NV (US)

( * ) Notice: Subject to any disclaimer, the term of this patent is extended or adjusted under 35 U.S.C. 154(b) by 608 days.

(21) Appl. No.: 12/242,507

(22) Filed: Sep. 30, 2008

(51) Int. Cl.
*G06F 21/00* (2006.01)

(52) U.S. Cl. .............. 434/51; 705/902; 705/54; 705/57; 705/59

(58) Field of Classification Search .................. 705/902, 705/51

See application file for complete search history.

(56) References Cited

U.S. PATENT DOCUMENTS

| | | | | |
|---|---|---|---|---|
| 5,986,690 | A * | 11/1999 | Hendricks | 725/60 |
| 6,901,386 | B1 * | 5/2005 | Dedrick et al. | 705/59 |
| 7,139,977 | B1 * | 11/2006 | Russell | 715/234 |
| 7,260,646 | B1 * | 8/2007 | Stefanik et al. | 709/238 |
| 7,320,140 | B1 * | 1/2008 | Boyer et al. | 726/6 |
| 7,509,270 | B1 * | 3/2009 | Hendricks et al. | 705/26.9 |
| 8,095,949 | B1 * | 1/2012 | Hendricks et al. | 725/29 |
| 2002/0107808 | A1 * | 8/2002 | Dobbelaar | 705/52 |
| 2004/0128308 | A1 * | 7/2004 | Obrador | 707/102 |
| 2005/0096938 | A1 * | 5/2005 | Slomkowski et al. | 705/1 |
| 2005/0132204 | A1 * | 6/2005 | Gouguenheim et al. | 713/185 |
| 2006/0062426 | A1 * | 3/2006 | Levy et al. | 382/100 |
| 2006/0075225 | A1 * | 4/2006 | Flynn et al. | 713/165 |
| 2006/0161578 | A1 * | 7/2006 | Siegel et al. | 707/102 |
| 2007/0162764 | A1 * | 7/2007 | Hass et al. | 713/187 |
| 2007/0243860 | A1 * | 10/2007 | Aiello et al. | 455/414.3 |
| 2007/0265977 | A1 * | 11/2007 | Read | 705/59 |
| 2007/0298399 | A1 * | 12/2007 | Shao et al. | 434/317 |
| 2008/0066181 | A1 * | 3/2008 | Haveson et al. | 726/26 |
| 2008/0103977 | A1 * | 5/2008 | Khosravy et al. | 705/59 |
| 2008/0109911 | A1 * | 5/2008 | Tedesco et al. | 726/30 |
| 2008/0114729 | A1 * | 5/2008 | Raman et al. | 707/3 |
| 2008/0250408 | A1 * | 10/2008 | Tsui et al. | 718/100 |
| 2011/0045816 | A1 * | 2/2011 | Wang et al. | 455/420 |
| 2011/0314556 | A1 * | 12/2011 | Dicke et al. | 726/27 |

FOREIGN PATENT DOCUMENTS

| | | | |
|---|---|---|---|
| GB | 2373609 A | * | 9/2002 |
| WO | WO 99/36917 | * | 7/1999 |
| WO | WO 01/75582 A2 | * | 10/2001 |

* cited by examiner

*Primary Examiner* — James A Reagan
*Assistant Examiner* — Calvin Cheung
(74) *Attorney, Agent, or Firm* — Lee & Hayes, PLLC

(57) ABSTRACT

A method for sharing electronic books may include receiving a request to borrow an electronic book. The request may be received from a borrowing user's electronic book reader. The method may also include generating a borrowing user's license for the electronic book. The method may also include transmitting a copy of the electronic book to the borrowing user's electronic book reader. The method may also include transmitting the borrowing user's license to the borrowing user's electronic book reader.

21 Claims, 11 Drawing Sheets

SHARING ELECTRONIC BOOKS

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Electronic technologies, such as computer technologies, relating to reducing the size and increasing the complexity of electronics have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded instantaneously at any time via the Internet.

One example of an electronic device is an electronic book ("e-book") reader. An e-book reader is a device that may be used to read e-books, which are digital media equivalents of conventional printed books. An e-book reader may also be used to read other types of printed materials, such as newspapers and magazines. E-book readers are becoming quite popular with consumers. As such, benefits may be realized from improved systems and methods related to user interactions with e-book readers.

DETAILED DESCRIPTION

The present disclosure relates generally to e-books. As indicated above, e-books are digital media equivalents of printed books. E-books may be read on dedicated hardware devices known as e-book readers (or e-book devices), or on other types of computing devices, such as personal computers, laptop computers, personal digital assistants (PDAs), etc.

Under some circumstances, a person may want to share an e-book with others. For example, after reading a novel, a person may think of one or more friends who would also like to read the same novel. As another example, a group of professionals may want to share a set of reference works among themselves. As yet another example, a school may want to loan e-books, which may be textbooks, to its students.

The present disclosure relates to techniques for facilitating the sharing of e-books. As used herein, the term "sharing" refers generally to the situation where two or more people are permitted to have access to the same instance of an e-book. Sharing does not necessarily involve any type of payment, although it may. For example, a person may loan an e-book to his/her friend without requiring payment. Conversely, a business may rent e-books to its customers for a fee. Both of these situations are considered to involve e-book "sharing" as that term is used herein.

The techniques disclosed herein permit restrictions to be placed on the ways that e-books may be shared with others. The restrictions for a particular e-book may be required by one or more individuals and/or entities that were involved in the production of the e-book (e.g., the author, publisher, seller, etc.). For example, there may be restrictions on the number of copies of an e-book that may be loaned to other people at any given time, restrictions on how someone may use an e-book that he/she has purchased while the e-book is being loaned to someone else, etc.

Under some circumstances, the sharing of e-books may be accomplished on a peer-to-peer basis, without the involvement of a separate server. For example, an e-book may be transferred directly from one e-book reader to another. Alternatively, one or more centralized controllers may be utilized to facilitate the sharing of e-books.

Figure 1:
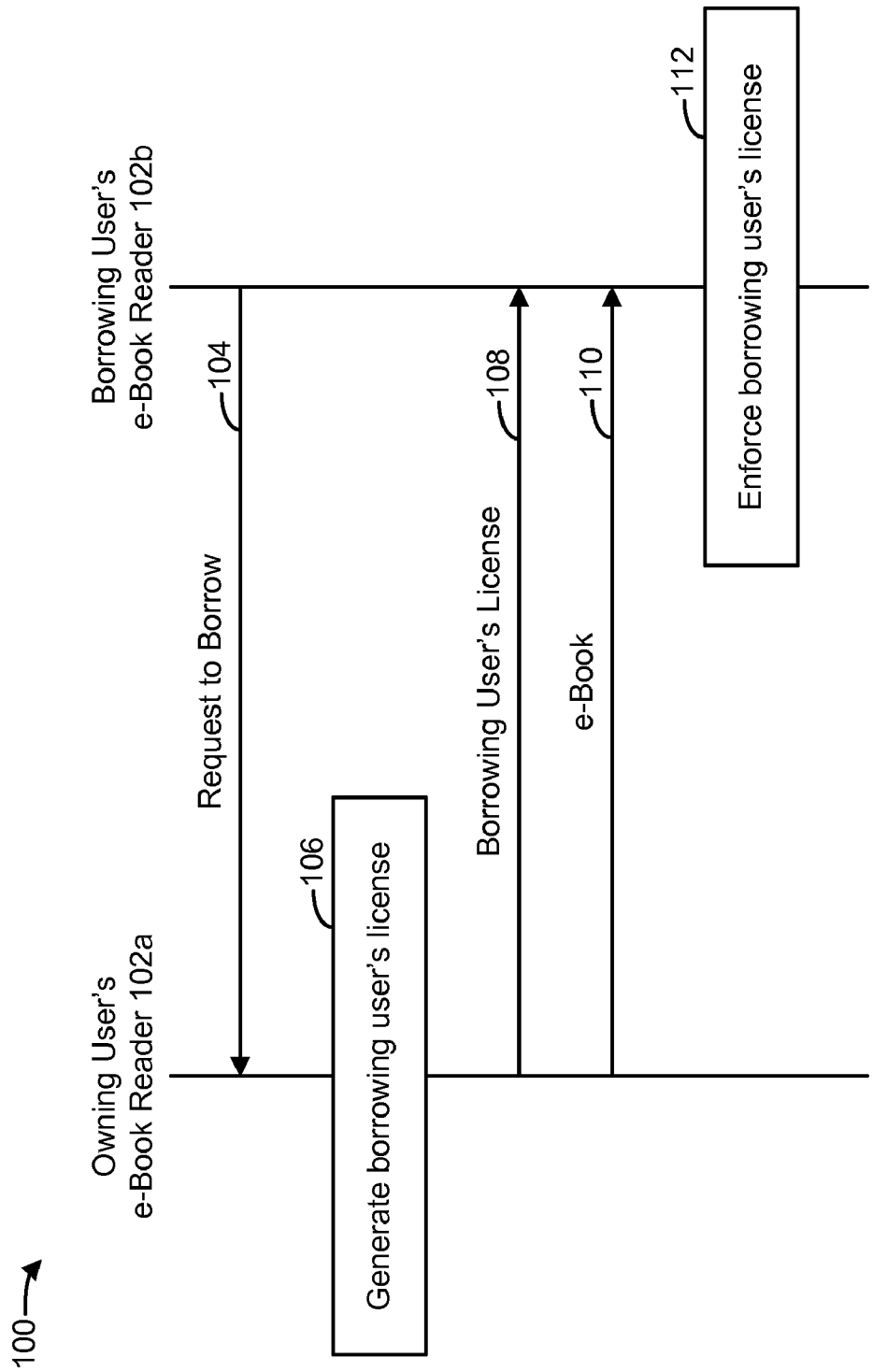
FIG. 1 illustrates an example of a method for sharing e-books.

FIG. 1 illustrates an example of a method 100 for sharing e-books. In the discussion of the method 100, it will be assumed that the owner of an e-book (the owning user) loans the e-book to someone else (the borrowing user). The method 100 may be implemented by two e-book readers 102, which will be referred to as the owning user's e-book reader 102a and the borrowing user's e-book reader 102b.

In the depicted method 100, the borrowing user's e-book reader 102b may send 104 a request to borrow an e-book to the owning user's e-book reader 102a. In response to receiving the request, the owning user's e-book reader 102a may generate 106 a license for the borrowing user. The license may specify the action(s) that are permitted with respect to the e-book that is being borrowed. The license may also specify the condition(s) associated with those action(s).

The owning user's e-book reader 102a may send 108 the license to the borrowing user's e-book reader 102b. The owning user's e-book reader 102a may also send 110 the e-book to the borrowing user's e-book reader 102b. The borrowing user's e-book reader 102b may then enforce 112 the license.

In the method 100 of FIG. 1, the sharing of the e-book is accomplished on a peer-to-peer basis between the borrowing user's e-book reader 102b and the owning user's e-book reader 102a. In other words, the sharing of the e-book is accomplished without the involvement of a separate server (e.g., a digital rights management (DRM) server).

Alternatively, one or more centralized e-book sharing servers may be utilized to facilitate the sharing of e-books. For example, an owning user may send a notice to an e-book sharing server indicating that he/she is willing to share a particular e-book. The owning user may even specify a person (or a group of people) with whom the owning user is willing to share the e-book. In response, the borrowing user may send a request to the e-book sharing server to borrow the e-book. The e-book sharing server may generate the borrowing user's license and send the borrowing user's license to the borrowing user's e-book reader 102b. The e-book that is to be shared may also be sent to the borrowing user's e-book reader 102b from the e-book sharing server. (Additional examples involving an e-book sharing server are discussed below in relation to FIGS. 8 and 9.)

Figure 2:
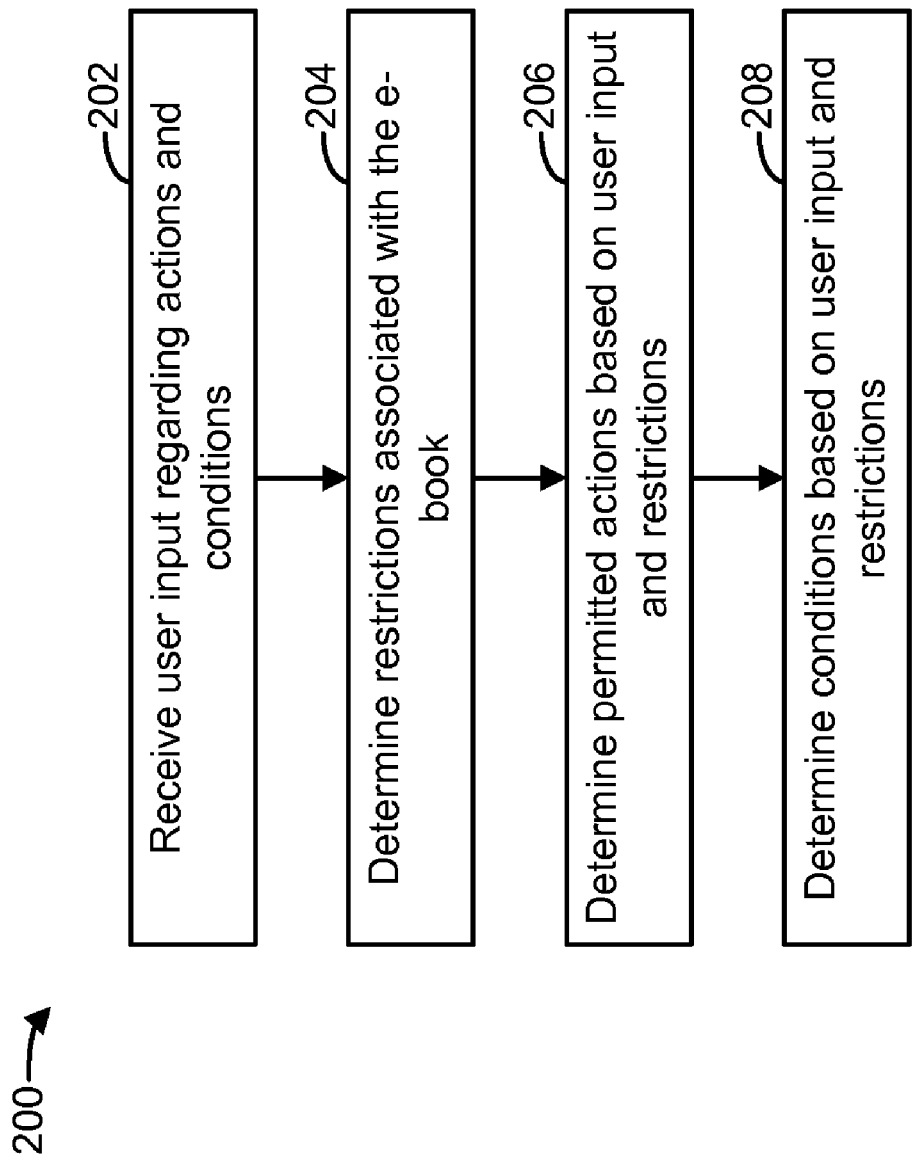
FIG. 2 illustrates an example of a method for generating a license for a borrowing user.

FIG. 2 illustrates an example of a method 200 for generating a license for a borrowing user. The owning user's e-book reader 102a may implement the depicted method 200.

The method 200 may include receiving 202 user input regarding the actions that the owning user would like to permit the borrowing user to take with respect to the e-book, and also regarding conditions that are associated with those actions. For example, the owning user may want to permit the borrowing user to read the e-book. This is an example of an action. The owning user may want to place a limit on the length of time that the borrowing user can read the e-book. This is an example of a condition that is associated with the action of reading the e-book.

The method 200 may also include determining 204 restrictions that are associated with the e-book that is going to be shared. For example, there may be restrictions on what the borrowing user may do with the e-book. These restrictions may be required by one or more individuals and/or entities that were involved in the production of the e-book (e.g., the author, publisher, seller, etc.).

The method 200 may also include determining 206 the permitted actions for the borrowing user based on the user input that is received, and also based on the restrictions that are associated with the e-book. For example, if the owning user wants to permit the borrowing user to read the e-book, and there are not any restrictions against this, then this may be one of the permitted actions in the borrowing user's license. However, if the owning user wants to permit the borrowing user to share the e-book with others, but this is prohibited by the restrictions, then this may not be one of the permitted actions in the borrowing user's license.

The method 200 may also include determining 208 the conditions that are associated with the permitted actions based on the user input that is received, and also based on the restrictions that are associated with the e-book. For example, the owning user may want to permit the borrowing user to be able to read the e-book for an unlimited amount of time. However, there may be a restriction which indicates that a borrowing user may only be allowed to borrow an e-book for a limited period of time (e.g., one month). In this example, there may be a condition in the borrowing user's license that the borrowing user is only permitted to read the e-book for the limited period of time that is specified in the restrictions.

Figure 3:
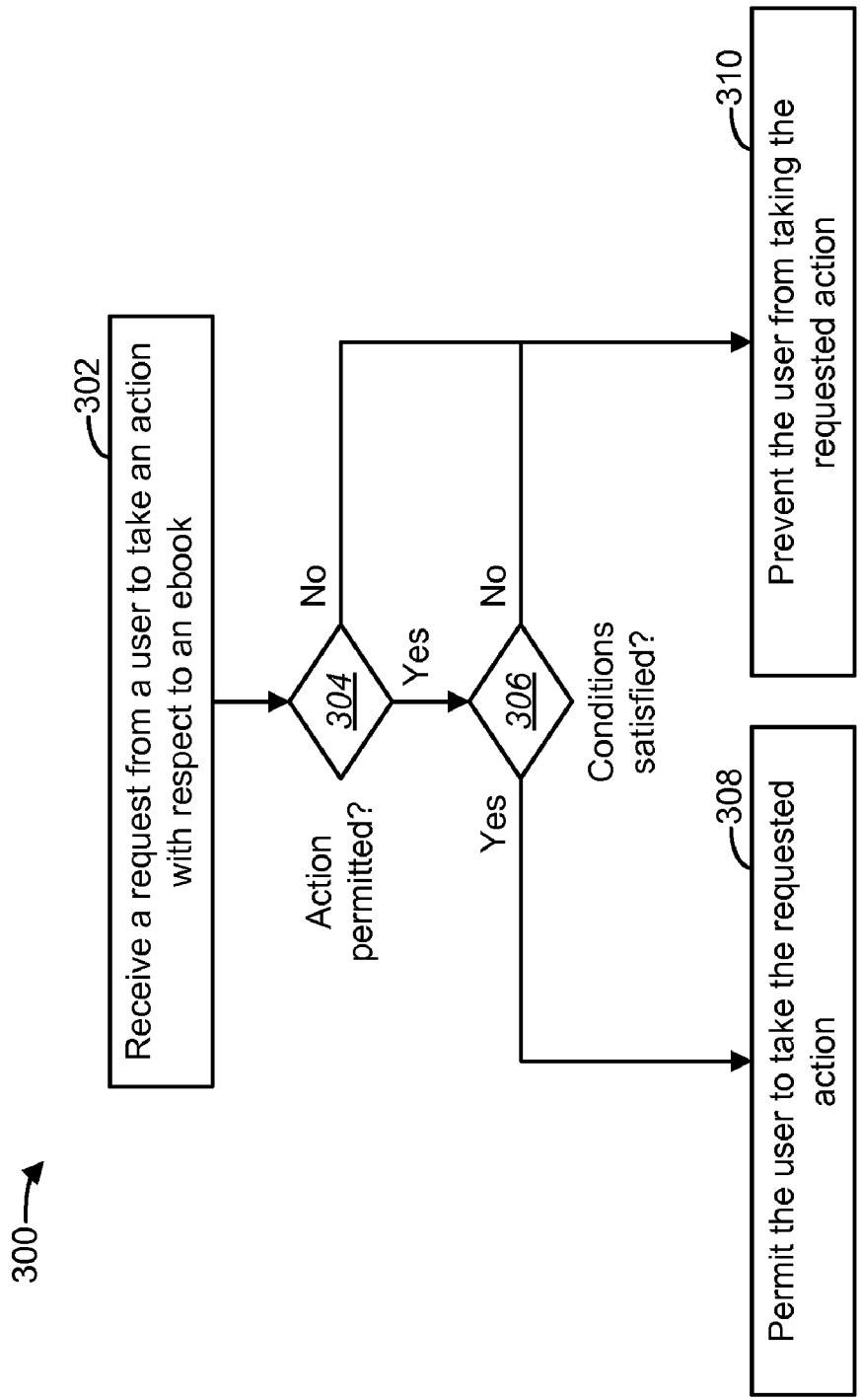
FIG. 3 illustrates an example of a method for enforcing a license for a borrowing user.

FIG. 3 illustrates an example of a method 300 for enforcing a license for a borrowing user. The borrowing user's e-book reader 102b may implement the depicted method 300.

The method 300 may include receiving 302 a request from the borrowing user to take an action with respect to an e-book. For example, the borrowing user may make a request to read the e-book, share the e-book with others, annotate the e-book, etc.

The method 300 may also include determining 304 whether the requested action is permitted, i.e., whether the requested action is one of the permitted actions in the borrowing user's license. If it is, then the method 300 may also include determining 306 whether any conditions associated with the action in the borrowing user's license are satisfied. If they are, then the method 300 may include permitting 308 the borrowing user to take the requested action.

However, if it is determined 304 that the requested action is not one of the permitted actions in the borrowing user's license, then the method 300 may include preventing 310 the borrowing user from taking the requested action. Alternatively, if the requested action is permitted, but it is determined 306 that one or more conditions associated with the action in the borrowing user's license are not satisfied, then the method 300 may include preventing 310 the borrowing user from taking the requested action.

Figure 4:
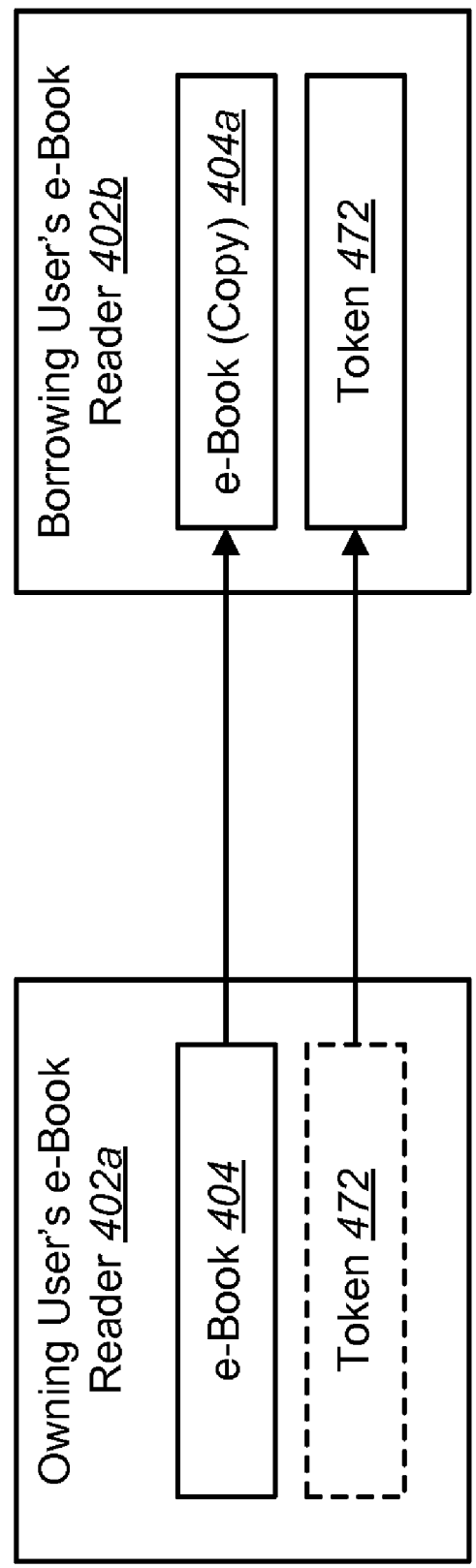
FIG. 4 illustrates an example showing how an e-book may be shared.

FIG. 4 illustrates an example showing how an e-book 404 may be shared. In this example, the owner of an e-book 404 would like to loan the e-book 404 to another person (the borrowing user). Thus, the owning user's e-book reader 402a may transmit a copy 404a of the e-book 404 to the borrowing user's e-book reader 402b.

In this example, the borrowing user's license is implemented as a token 472 that is associated with the e-book 404 to be shared. The token 472 facilitates access to the e-book 404. In other words, when a user of an e-book reader 402 tries to read an e-book 404, the e-book reader 402 checks to see whether the token 472 is stored on the e-book reader 402. If it is, then the user is permitted to read the e-book 404. However, if the token 472 is not stored on the e-book reader 402, then the user is not permitted to read the e-book 404.

When the copy 404a of the e-book 404 is transmitted to the borrowing user's e-book reader 402b, the owning user's e-book reader 402a may also transmit the token 472 to the borrowing user's e-book reader 402b. When the token 472 is transmitted to the borrowing user's e-book reader 402b, the token 472 may be deleted from the owning user's e-book reader 402a.

The copy 404a of the e-book 404 may be used on the borrowing user's e-book reader 402b as long as the token 472 is stored on the borrowing user's e-book reader 402b. Because the token 472 has been deleted from the owning user's e-book reader 402a, the owning user may not be permitted to read the e-book 404 while the e-book 404 is being loaned to the borrowing user. When the borrowing user is finished with the e-book 404, the token 472 may be sent back to the owning user's e-book reader 402a so that the owning user may once again read (or otherwise make use of) the e-book 404.

Figure 5:
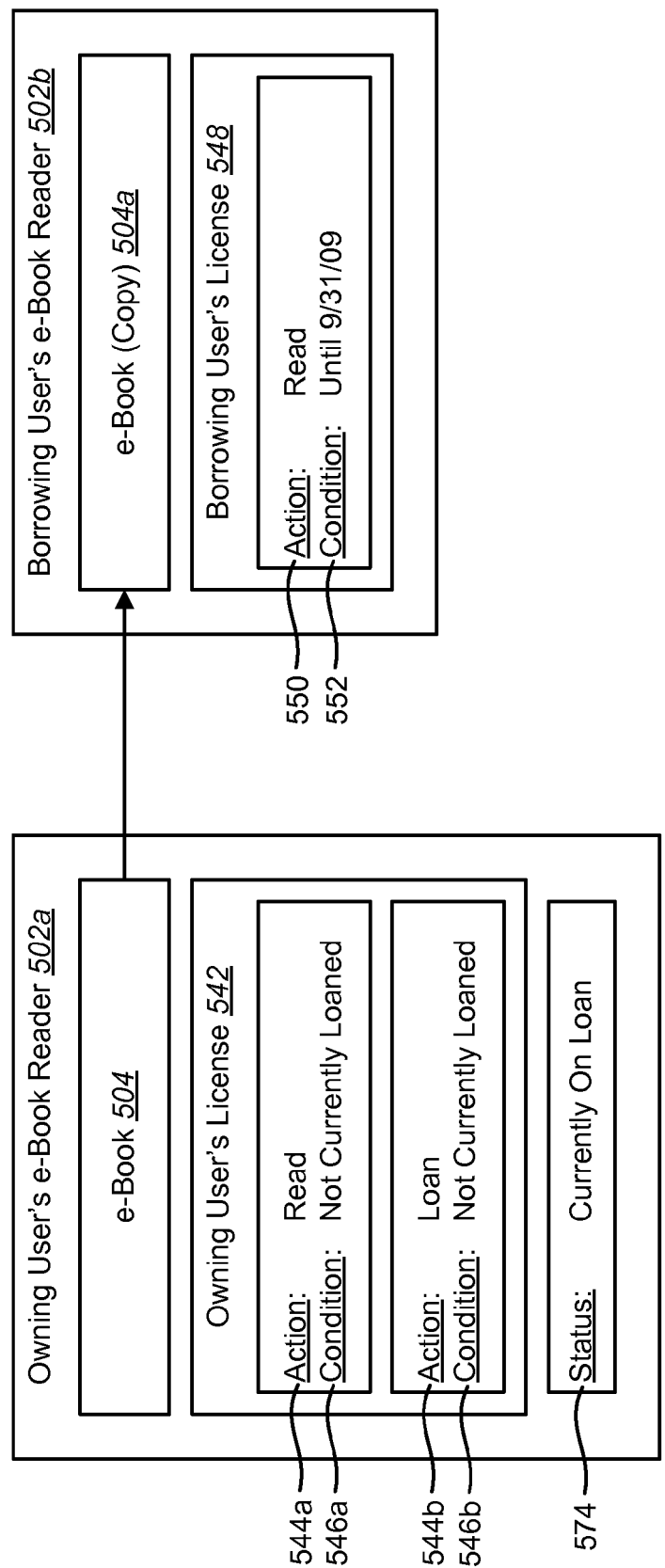
FIG. 5 illustrates another example showing how an e-book may be shared.

FIG. 5 illustrates another example showing how an e-book 504 may be shared. In this example, it will be assumed that the owner of an e-book 504 would like to loan the e-book 504 to another person (the borrowing user). Thus, the owning user's e-book reader 502a may transmit a copy 504a of the e-book 504 to the borrowing user's e-book reader 502b.

A license 542 that enforces restrictions that are related to the owning user of the e-book 504 may be provided. The owning user's license 542 may include a first permitted action 544a. The first permitted action 544a may be that the owning user may read the e-book 504. A condition 546a may be associated with the first permitted action 544a. The condition 546a may be that the owning user may read the e-book 504 only when the e-book 504 is not currently being loaned to someone else.

The owning user's license 542 may also include a second permitted action 544b. The second permitted action 544b may be that the owning user may loan the e-book 504 to another person. A condition 546b may be associated with the second permitted action 544b. The condition 546b may be that the owning user may loan the e-book 504 only when the e-book 504 is not currently on loan to someone else (i.e., the owning user may not loan the e-book 504 to more than one person at a time).

A license 548 that enforces restrictions that are related to the borrowing user of the e-book 504 may also be provided. The borrowing user's license 548 may include a permitted action 550. The permitted action 550 may be that the borrowing user may read the e-book 504. A condition 552 may be associated with the permitted action 550. The condition 552 may be that the borrowing user may read the e-book 504 only for a limited period of time.

Status information 574 may be stored in the memory of the owning user's e-book reader 502a. The status information 574 may indicate whether the e-book 504 is currently on loan or not. In this example, the status information 574 may indicate that the e-book 504 is currently on loan for the period of time that the borrowing user is allowed to read the e-book 504 (e.g., until Sep. 31, 2009).

Figure 6:
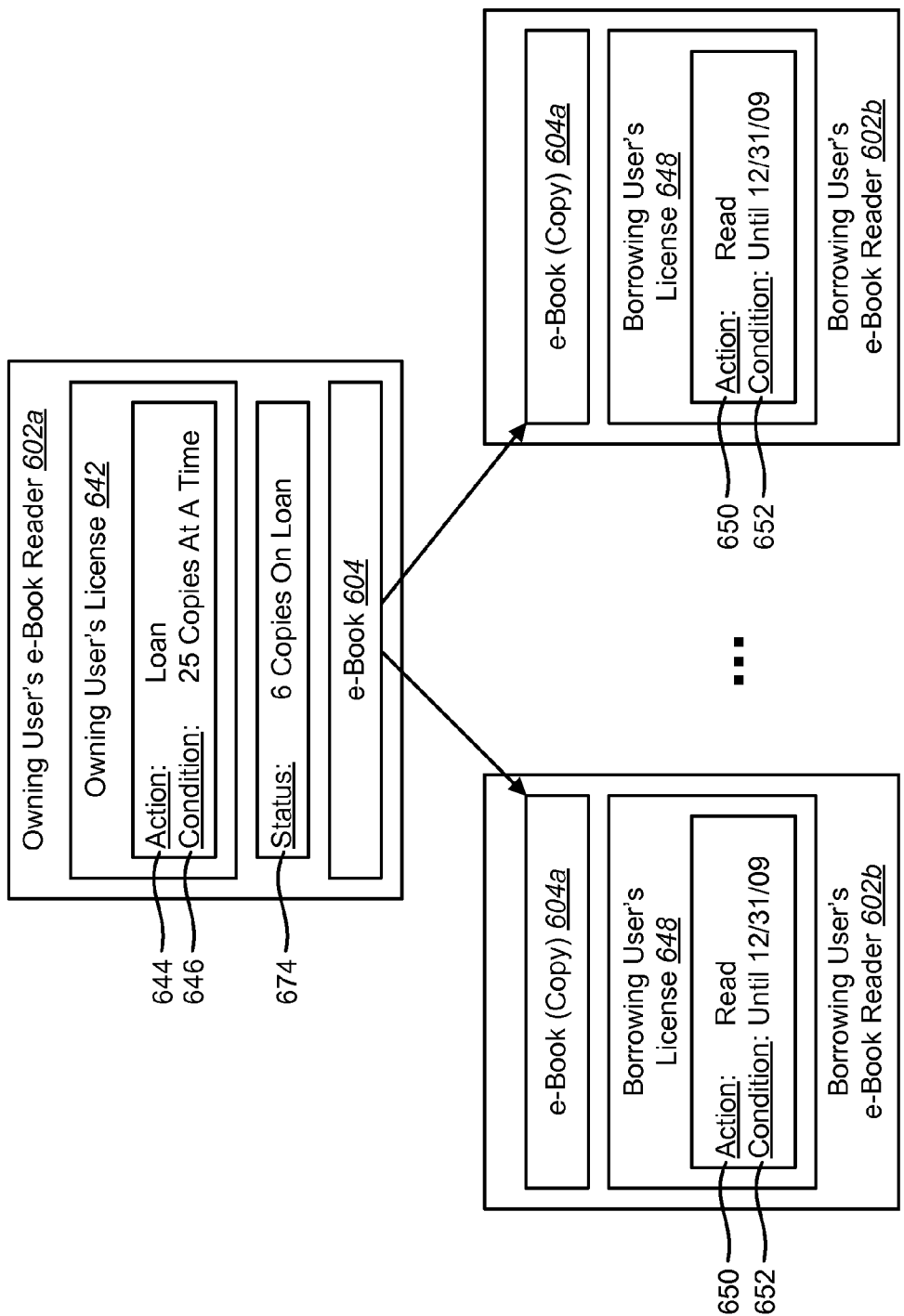
FIG. 6 illustrates another example showing how an e-book may be shared.

FIG. 6 illustrates another example showing how an e-book 604 may be shared. In this example, it will be assumed that the owner of an e-book 604 would like to loan the e-book 604 to multiple people (the borrowing users). The example of FIG. 6 may be relevant in a school environment, where a school may loan e-books 604 (which may be textbooks) to its students. The example of FIG. 6 may also be relevant in a library environment, where a library may loan e-books 604 to its patrons. The example of FIG. 6 may also be relevant in a business environment, where a business may rent e-books 604 to its patrons. The example of FIG. 6 may also be relevant in other situations as well, such as a book club where the members read e-books 604 instead of conventional printed books.

A license 642 that enforces restrictions that are related to the owning user of the e-book 604 may be provided. The owning user's license 642 may include a permitted action 644. The permitted action 644 may be that the owning user may loan the e-book 604 to other people. A condition 646 may be associated with the permitted action 644. The condition 646 may be that there may not be more than a certain number of copies 604a of the e-book 604 that are loaned at a particular time.

A license 648 that enforces restrictions that are related to the borrowing user of the e-book 604 may be provided for each borrowing user. The borrowing user's license 648 may include a permitted action 650. The permitted action 650 may be that the borrowing user may read the e-book 604. A condition 652 may be associated with the permitted action 650. The condition 652 may be that the borrowing user may read the e-book 604 only for a limited period of time. In a school environment, the limited period of time may correspond to the duration of a class (e.g., one semester). In a library environment, the limited period of time may correspond to the period of time that a library patron is allowed to check out regular books.

Status information 674 may be stored in the memory of the owning user's e-book reader 602a. The status information 674 may indicate how many copies 604a of the e-book 604 are currently on loan. When an attempt is made to loan a copy 604a of the e-book 604 to another person, the status information 674 may be checked to verify that loaning another copy 604a of the e-book 604 would not cause the condition 646 in the owning user's license 642 to be violated.

Figure 7:
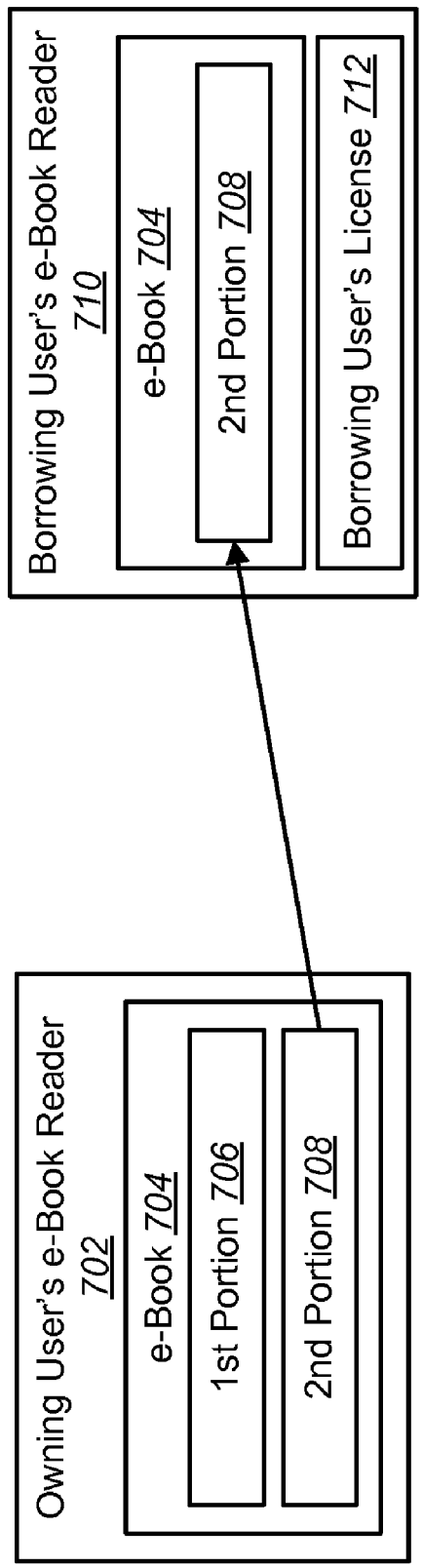
FIG. 7 illustrates an example showing how the techniques described herein may be used to facilitate the sharing of a portion of an e-book.

Reference is now made to FIG. 7. FIG. 7 illustrates an example showing how the techniques described herein may be used to facilitate the sharing of a portion of an e-book 704, instead of (or possibly in addition to) an entire e-book 704.

An owning user's e-book reader 702 is shown with an e-book 704 stored on the reader 702. The e-book 704 is shown with a first portion 706 and a second portion 708. The different portions 706, 708 of the e-book may represent different chapters of the e-book 704. As another example, suppose that the e-book 704 is an electronic newspaper. The first portion 706 of the electronic newspaper may correspond to a news section, and the second portion 708 of the electronic newspaper may correspond to a sports section.

FIG. 7 also illustrates a borrowing user's e-book reader 710. At some point, the owning user may wish to share a portion (e.g., the second portion 708) of the e-book 704 with the borrowing user. A borrowing user's license 712 may be generated for the second portion 708 of the e-book 704. The second portion 708 of the e-book 704 and the borrowing user's license 712 may be transmitted from the owning user's e-book reader 702 to the borrowing user's e-book reader 710. However, in the depicted example, the first portion 706 of the e-book 704 is not transmitted to the borrowing user's e-book reader 710, because the first portion 706 of the e-book 704 is not being shared.

Alternatively, however, both the first portion 706 and the second portion 708 of the e-book 704 may be transmitted to the borrowing user's e-book reader 710, and a borrowing user's license 712 may enforce the rule that only the second portion 708 of the e-book 704 may be viewed on the borrowing user's e-book reader 710. In other words, both the first portion 706 and the second portion 708 of the e-book 704 may be stored on the borrowing user's e-book reader 710, but the borrowing user's license 712 may prevent the borrowing user from viewing the first portion 706 of the e-book 704.

Figure 8:
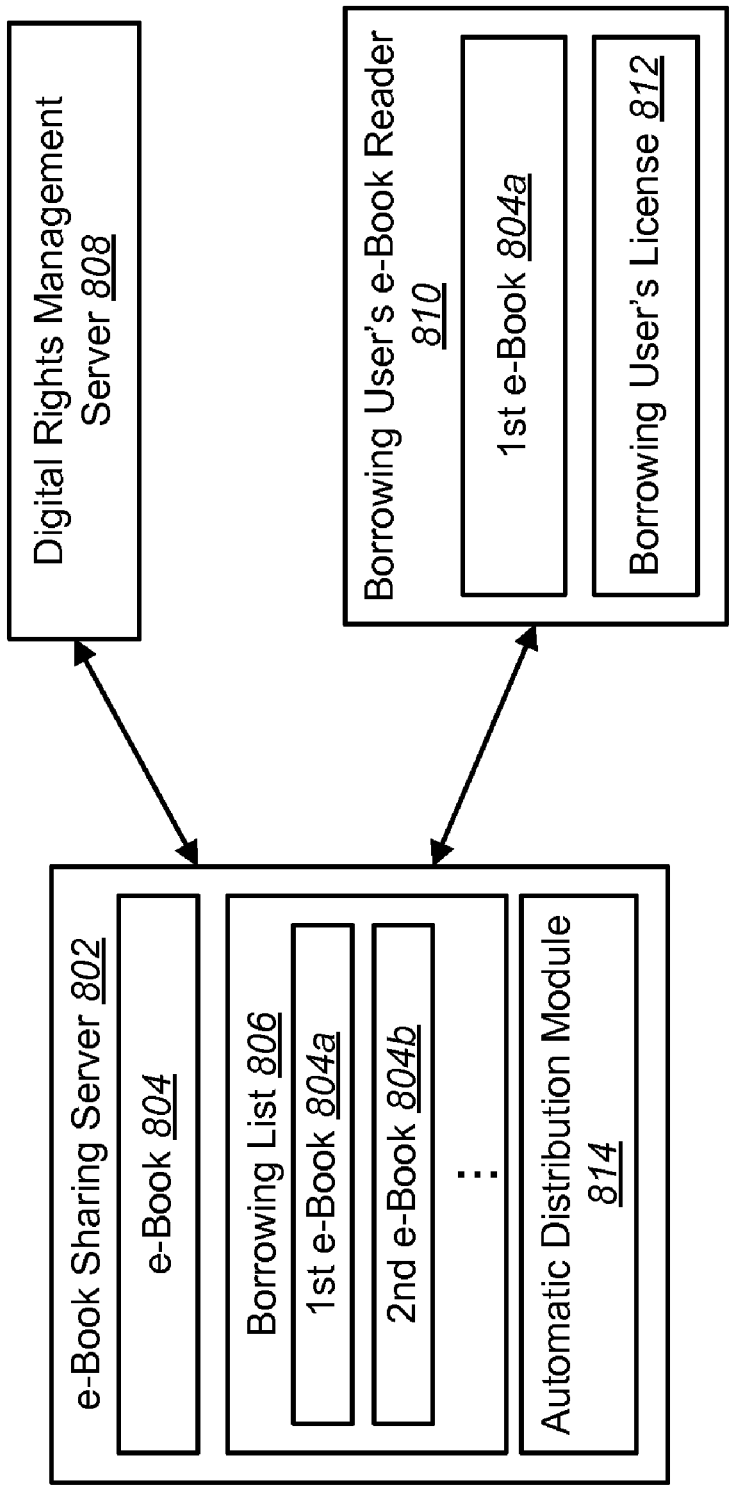
FIG. 8 illustrates an example showing how an e-book sharing server may be used to facilitate the sharing of e-books in accordance with the present disclosure.

Reference is now made to FIG. 8. FIG. 8 illustrates an example showing how an e-book sharing server 802 may be used to facilitate the sharing of e-books 804 in accordance with the present disclosure.

In many of the examples discussed above, e-book 804 sharing was accomplished by means of peer-to-peer distribution of e-books 804. However, as an alternative to peer-to-peer distribution, e-book 804 sharing may be accomplished by means of an e-book sharing server 802. FIG. 8 shows an e-book sharing server 802 in electronic communication with a borrowing user's e-book reader 810. The e-book sharing server 802 includes multiple e-books 804 which may be shared with (e.g., loaned to) users. The e-book sharing server 810 may interact with a digital rights management server 808 to generate a borrowing user's license 812 when an e-book 804 is shared.

FIG. 8 also shows an example of how a borrowing list 806 may be implemented. The borrowing list 806 is shown on the e-book sharing server 802. The borrowing list 806 may provide a way for a user to specify the order in which the user receives e-books 804. For example, suppose that a user may only share one e-book 804 at a time from the e-book sharing server 802. The user may create a borrowing list 806 which specifies the e-books 804 that the user wants to share, and the order in which the user would like to receive the e-books 804. Thus, the borrowing list 806 may be thought of as a type of queue.

In the depicted example, the borrowing list 806 includes a first e-book 804a and a second e-book 804b. Initially, a borrowing user may receive the first e-book 804a in the borrowing list 806 and a borrowing user's license 812 to accompany the first e-book 804a. The borrowing user may make use of the first e-book 804a in accordance with the terms of the borrowing user's license 812. When the borrowing user is finished with the first e-book 804a, or when the terms of the borrowing user's license 812 indicate that the user may no longer make use of the first e-book 804a, then the next e-book 804b in the borrowing list 806 (i.e., the second e-book 804b) may be provided to the borrowing user (e.g., sent to the borrowing user's e-book reader 810), along with a borrowing user's license 812 for the second e-book 804b.

Advantageously, the second e-book 804b may be provided to the borrowing user's e-book reader 810 automatically, without additional user action. For example, immediately after the borrowing user's license 812 indicates that the first e-book 804*a* may no longer be used on the borrowing user's e-book reader 810, the second e-book 804*b* may be automatically sent to the borrowing user's e-book reader 810, without the user having to request the second e-book 804*b* from the e-book sharing server 802. The e-book sharing server 802 is shown with an automatic distribution module 814. The automatic distribution module 814 may be configured to automatically distribute e-books 804 in the borrowing list 806 in this manner.

Figure 9:
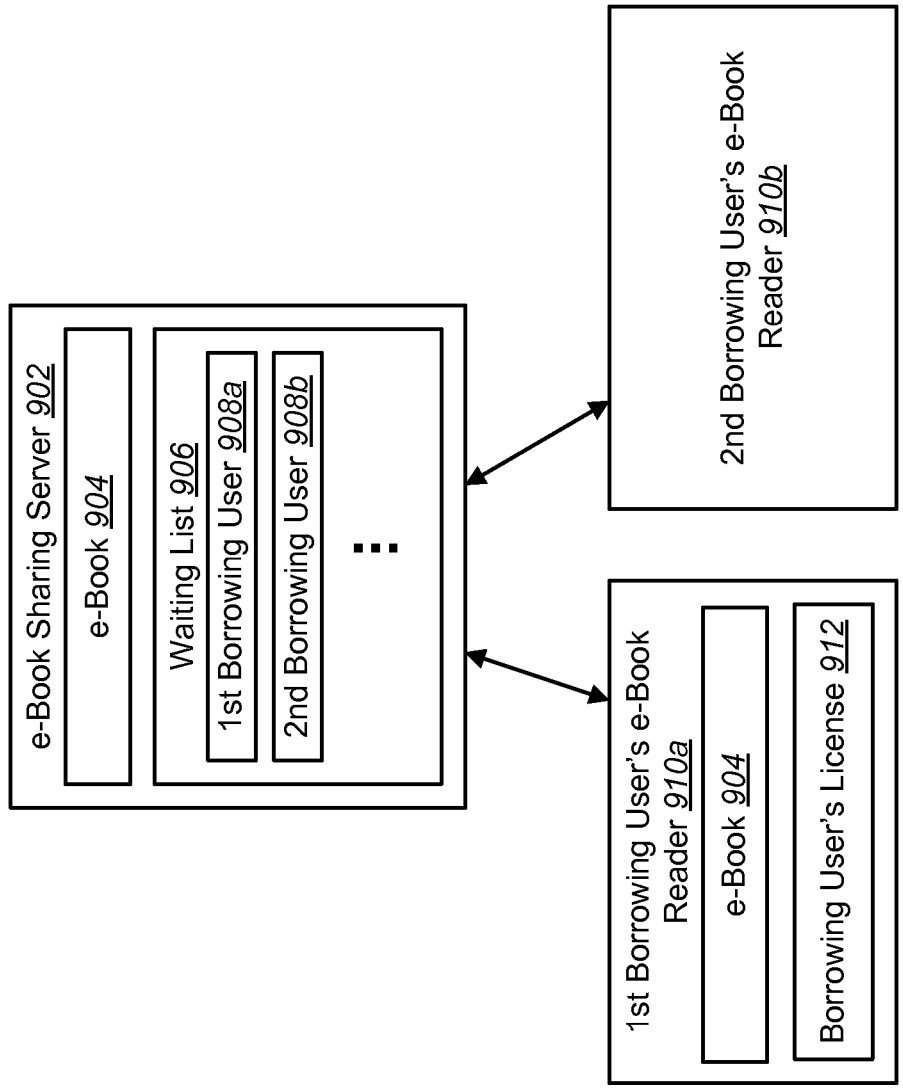
FIG. 9 illustrates an example showing how a waiting list may be implemented in relation to the sharing of e-books.

Reference is now made to FIG. 9. FIG. 9 illustrates an example showing how a waiting list 906 may be implemented in relation to the sharing of e-books 904.

In FIG. 9, a waiting list 906 is shown on an e-book sharing server 902. The waiting list 906 may correspond to a particular e-book 904. For example, the waiting list 906 may include multiple users 908 who have signed up to receive the e-book 904 when it becomes available. The e-book 904 may be shared with (e.g., loaned to) the users 908 who have signed up for the waiting list 906.

For example, an e-book 904 associated with the waiting list 906 that is shown in FIG. 9 may initially be provided to a first borrowing user 908*a*. The e-book 904 may be automatically transmitted to the first borrowing user's e-book reader 910*a*. When the first borrowing user 908*a* is finished with the e-book 904, or when the terms of the borrowing user's license 912 indicate that the first borrowing user 908*a* may no longer use the e-book 904, then the e-book 904 may be provided to the second borrowing user 908*b* (i.e., the next user in the waiting list 906), and the e-book 904 may be automatically distributed to the second borrowing user's e-book reader 910*b*.

Figure 10:
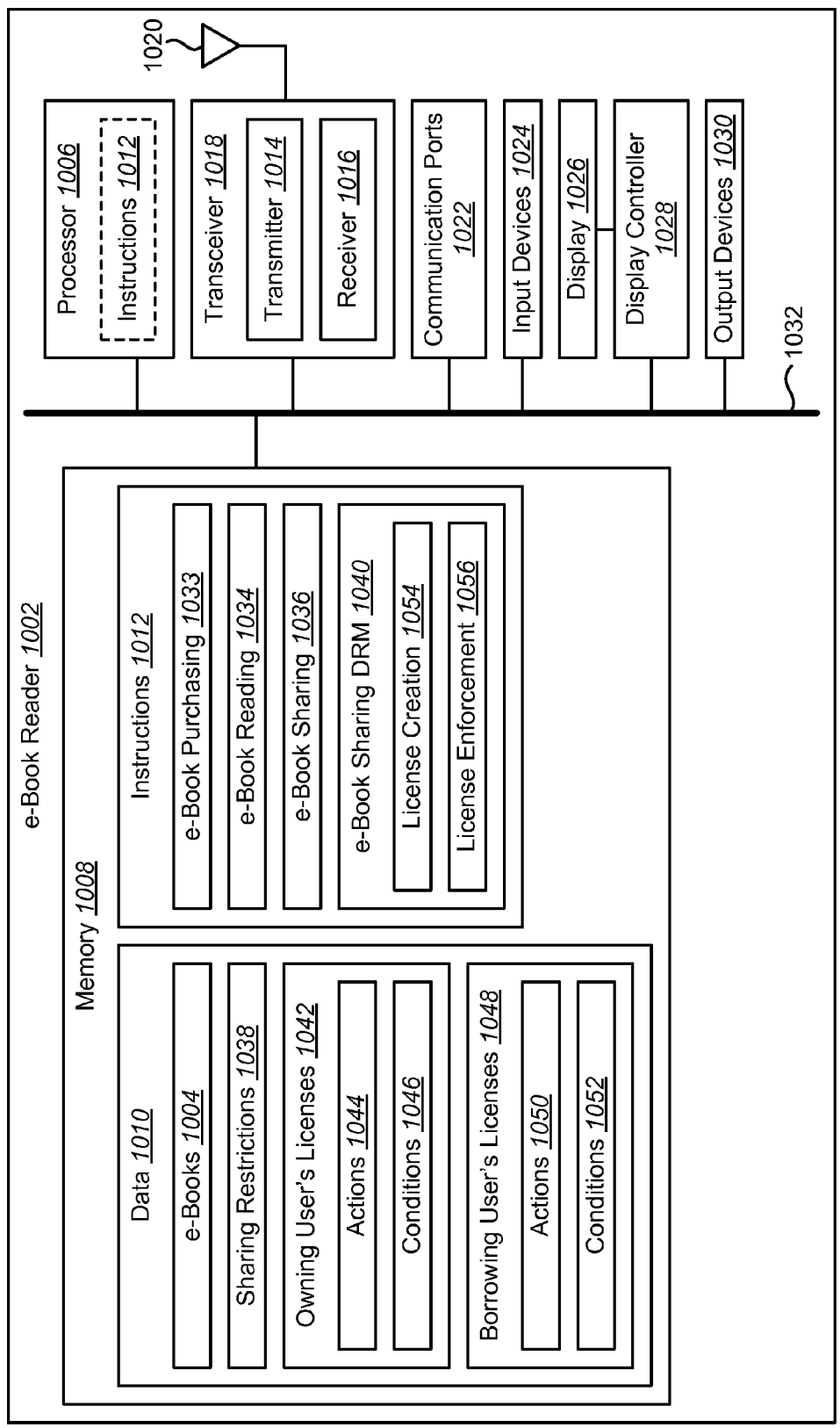
FIG. 10 illustrates an example of an e-book reader that is configured to facilitate sharing of e-books.

FIG. 10 illustrates an example of an electronic book ("e-book") reader 1002 that is configured to facilitate sharing of e-books 1004. The e-book reader 1002 is a device that may be used to read e-books 1004. The e-book reader 1002 may be specifically designed for the purpose of reading e-books 1004. Alternatively, the e-book reader 1002 may be intended for other purposes as well.

The e-book reader 1002 includes a processor 1006. The processor 1006 may be a general purpose single- or multi-chip microprocessor (e.g., an ARM), a special purpose microprocessor (e.g., a digital signal processor (DSP)), a microcontroller, a programmable gate array, etc. The processor 1006 may be referred to as a central processing unit (CPU). Although just a single processor 1006 is shown in the e-book reader 1002 of FIG. 10, in an alternative configuration, a combination of processors 1006 (e.g., an ARM and DSP) could be used.

The e-book reader 1002 also includes memory 1008. The memory 1008 may be any electronic component capable of storing electronic information. The memory 1008 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1010 and instructions 1012 may be stored in the memory 1008. The instructions 1012 may be executable by the processor 1006 to implement various functions, including the methods described herein. Executing the instructions 1012 may involve the use of the data 1010 that is stored in the memory 1008.

The e-book reader 1002 may also include a transmitter 1014 and a receiver 1016 to allow transmission and reception of data between the e-book reader 1002 to/from a remote location. The transmitter 1014 and receiver 1016 may be collectively referred to as a transceiver 1018. An antenna 1020 may be electrically coupled to the transceiver 1018. The e-book reader 1002 may also include (not shown) multiple transmitters 1014, multiple receivers 1016, multiple transceivers 1018 and/or multiple antenna 1020.

The e-book reader 1002 may also include one or more communication ports 1022 for communicating with other electronic devices. Communication with other electronic devices may occur directly and/or via a computer network. Some examples of communication ports 1022 include Ethernet ports, Universal Serial Bus (USB) ports, parallel ports, serial ports, etc.

The e-book reader 1002 may also include one or more input devices 1024. Examples of input devices 1024 include a keyboard, mouse, remote control device, microphone, button, joystick, trackball, touchpad, lightpen, etc.

The e-book reader 1002 may also include a display 1026. A display controller 1028 may also be provided, for converting data 1010 stored in the memory 1008 into text, graphics, and/or moving images (as appropriate) shown on the display 1026.

The display 1026 may be an electronic paper display, which is a display that is capable of holding text and images indefinitely without drawing electricity, while allowing the text and images to be changed later. There are several different technologies that may be used to create an electronic paper display, including electrophoretic display technology, bistable liquid crystal display (LCD) technology, cholesteric LCD display technology, etc. Alternatively, the display 1026 may utilize another image projection technology, such as liquid crystal display (LCD), gas plasma, light-emitting diode (LED), etc. One or more other output devices 1030, such as audio speakers, may also be included in the e-book reader 1002.

The various components of the e-book reader 1002 may be coupled together by one or more buses, which may include a power bus, a control signal bus, a status signal bus, a data bus, etc. For the sake of clarity, the various buses are illustrated in FIG. 10 as a bus system 1032.

The data 1010 in the memory 1008 may include one or more e-books 1004. An e-book 1004 is the digital media equivalent of a conventional printed book.

The instructions 1012 in the memory 1008 may include instructions 1033 that, when executed by the processor 1006, permit a user of the e-book reader 1002 to purchase e-books 1004. When a user of the e-book reader 1002 purchases an e-book 1004, the e-book reader 1002 may connect to a payment processing server so that the user can arrange to pay for the purchase of the e-book 1004. When payment has been arranged, the e-book reader 1002 may download the purchased e-book 1004 from a content server. The e-books 1004 that are purchased may be stored on the e-book reader 1002.

The instructions 1012 in the memory 1008 may also include instructions 1034 that, when executed by the processor 1006, permit a user of the e-book reader 1002 to read the e-books 1004 that are stored on the e-book reader 1002. When a user reads an e-book 1004, the pages of the e-book 1004 may be shown on the display 1026. The user may be permitted to navigate to different parts of the e-book 1004 (e.g., different pages, chapters, etc.) via the input devices 1024 and/or via user interface controls that are shown on the display 1026.

The instructions 1012 in the memory 1008 may also include instructions 1036 that, when executed by the processor 1006, permit the user of the e-book reader 1002 to share e-books 1004 that are stored on the e-book reader 1002 with other people, as described herein.

The instructions 1012 in the memory 1008 may also include instructions 1040 that, when executed by the processor 1006, enforce the sharing restrictions 1038 described herein. In other words, these instructions 1040 may facilitate digital rights management (DRM) that is related to the sharing of e-books 1004.

To enforce the sharing restrictions 1038 related to the sharing of a particular e-book 1004, licenses may be created. As discussed above, there may be owning user's licenses 1042 that enforce restrictions 1038 that are related to the owning user of the e-book 1004. Such licenses 1042 may specify permitted actions 1044, and there may be conditions 1046 associated with the permitted actions 1044. There may also be borrowing user's licenses 1048 that enforce restrictions 1038 that are related to the borrowing user of the e-book 1004. These licenses 1048 may also specify permitted actions 1050 and associated conditions 1052.

The e-book sharing DRM instructions 1040 may include instructions 1054 that may be executed by the processor 1006 to create owning user's licenses 1042 and/or borrowing user's licenses 1048. The e-book sharing DRM instructions 1040 may also include instructions 1056 that may be executed by the processor 1006 to enforce the licenses 1042, 1048 that are created.

Figure 11:
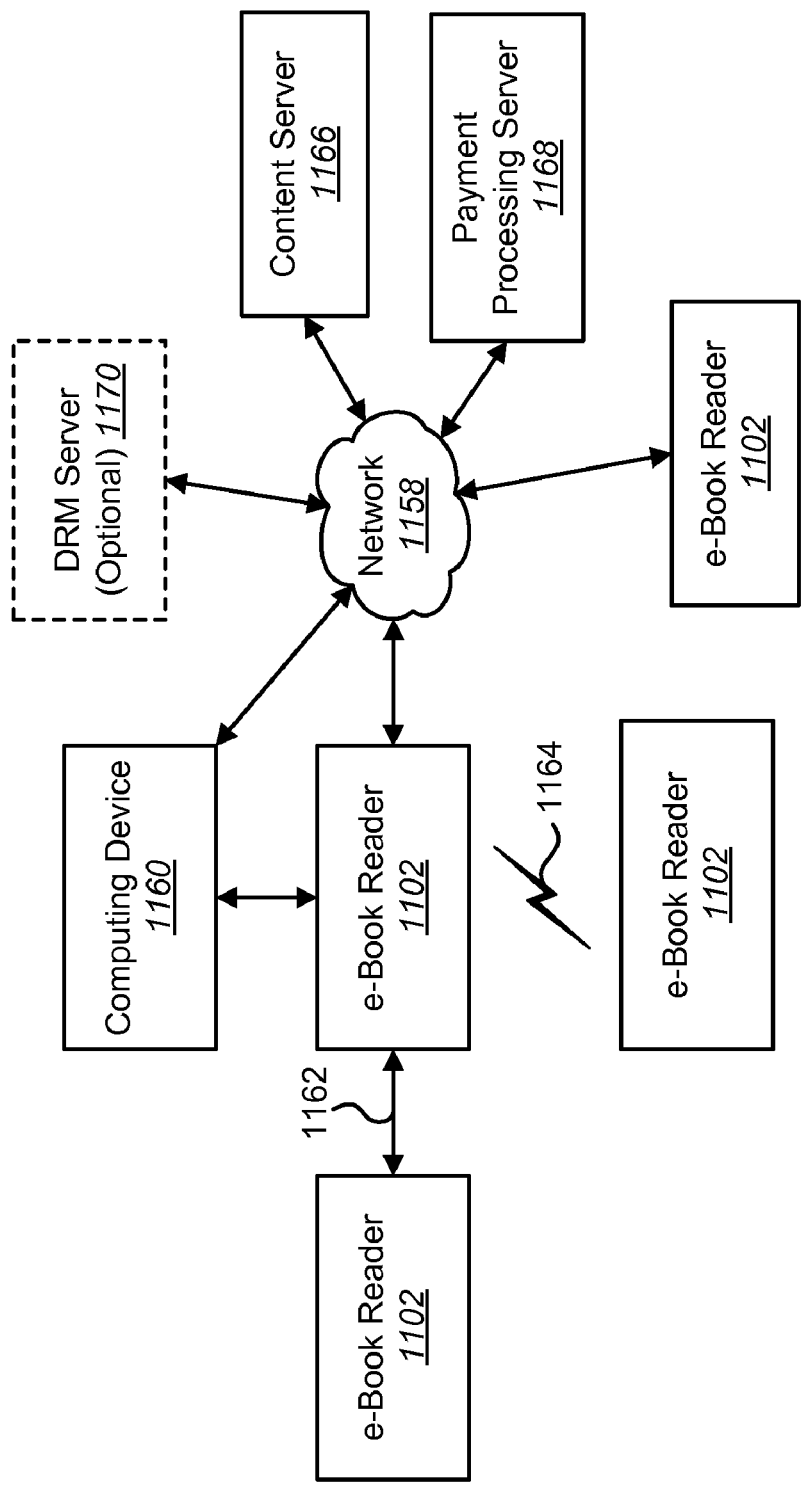
FIG. 11 illustrates various examples of ways that e-book readers may communicate with one another.

FIG. 11 illustrates various examples of ways that e-book readers 1102 may communicate with one another. For example, e-book readers 1102 may communicate with one another via one or more networks 1158, which may be computer networks and/or wireless communication networks. An e-book reader 1102 may be configured to connect directly to a network 1158, or it may connect to a network 1158 via a computing device 1160. As another example, an e-book reader 1102 may be configured to establish a direct connection 1162 with another e-book reader 1102. As another example, an e-book reader 1102 may be configured to establish a short-range wireless connection 1164 (e.g., a Bluetooth® connection) with another e-book reader 1102.

FIG. 11 also illustrates various examples of servers that may perform functions that are related to the sharing of e-books. As shown, e-book readers 1102 may be in electronic communication with a content server 1166 and a payment processing server 1168. When a user of an e-book reader 1102 purchases an e-book, the e-book reader 1102 may connect to the payment processing server 1168 so that the user can arrange to pay for the purchase of the e-book. When payment has been arranged, the e-book reader 1102 may download the purchased e-book from the content server 1166.

E-book readers 1102 may be configured to enforce the restrictions related to the sharing of e-books without the involvement of a DRM server 1170. In other words, the sharing of e-books may be accomplished on a peer-to-peer basis, rather than a server-client basis. Alternatively, e-book readers 1102 may be in electronic communication with a DRM server 1170 that performs some or all of the functions associated with enforcing the sharing restrictions.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the terms "code" and "instructions" should be interpreted broadly to include any type of computer-readable statement(s). For example, the terms "code" and "instructions" may refer to one or more applications, programs, routines, sub-routines, functions, procedures, etc.

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A primary computing device that is configured to facilitate sharing of digital media, comprising:
    a processor;
    memory in electronic communication with the processor;
    instructions stored in the memory, the instructions being executable to:
        receive a plurality of requests for a copy of a digital media, wherein the respective requests are received from a plurality of secondary computing devices;
        determine at least one permitted action for users of the plurality of secondary computing devices regarding the requested digital media, wherein the at least one permitted action is specified by a user of the primary computing device;
        determine restrictions associated with the requested digital media, wherein the restrictions are imposed by an entity other than the user of the primary computing device and the restrictions limit the scope of the permitted actions specified for the users of the plurality of secondary computing devices;
        generate licenses for the requested digital media, wherein the licenses comprise the at least one permitted action and the restrictions, a number of licenses limited by the entity other than the user of the primary computing device;
        transmit a one of the copies of the digital media and one of the licenses to one of the secondary computing devices; and
        when a number of the secondary computing devices requesting the digital media exceeds the number of licenses, refrain from transmitting additional copies of the digital media to secondary computing devices until a license becomes available.

2. The primary computing device of claim 1, wherein the transmission of the licenses is accomplished between the primary computing device and the plurality of secondary computing devices, without involvement of a separate digital rights management server.

3. The primary computing device of claim 1, wherein the at least one permitted action comprises reading the digital media.

4. The primary computing device of claim 1, wherein the at least one permitted action comprises further sharing of the digital media.

5. The primary computing device of claim 1, wherein the at least one permitted action comprises annotating the digital media.

6. The primary computing device of claim 1, further comprising receiving a fee from at least one of the users of the secondary computing devices in exchange for transferring a copy of the digital media and the license.

7. The primary computing device of claim 1, further comprising storing a record of a number of copies of the digital media that are currently transmitted to the secondary computing devices.

8. A tangible computer-readable medium storing instructions, that when executed by a processor, cause a first computing device to perform acts comprising:
    receiving a request for a portion of digital media from a second computing device, wherein the portion of the digital media is less than the entire digital media;
    generating a license for the requested portion of the digital media;
    transmitting a copy of the entire digital media to the second computing device;
    transmitting the license to the second computing device, wherein the license provides the second computing device access to the requested portion of the digital media but not to the entire digital media; and
    preventing the first computing device from displaying the requested portion of the digital media when the license for the requested portion of the digital media is present on the second computing device.

9. The tangible computer-readable medium of claim 8, wherein the license is generated and transmitted to the second computing device without the involvement of a separate digital rights management server.

10. The tangible computer-readable medium of claim 8, wherein the license is implemented as a token that is required to access the requested portion of the digital media.

11. The tangible computer-readable medium of claim 8, wherein the license comprises:
    an action that the second computing device is permitted to perform with respect to the requested portion of the digital media; and
    a condition associated with the permitted action.

12. The tangible computer-readable medium of claim 8, wherein generating the license comprises:
    determining permitted actions based on input from a user of the first computing device and based upon restrictions from an entity other than the user of the first computing device; and
    determining conditions associated with the permitted actions and the restrictions.

13. A computing device that is configured to facilitate transmission of digital media, comprising:
    a processor;
    memory in electronic communication with the processor;
    instructions stored in the memory, the instructions being executable to:
        receive a request for digital media;
        generate a license for the requested digital media, wherein the license is implemented as a token that is stored on the computing device and is required to access the digital media;

transmit a copy of the digital media to a requesting device while retaining a copy of the digital media on the computing device;

transmit the token to the requesting device, wherein transmitting the token to the requesting device deletes the token from the computing device when the copy of the digital media is transmitted to the requesting device and thereby prevents the computing device from accessing the digital media; and receive the token back from the requesting device and thereby regain access to the copy of the digital media on the computing device.

14. The computing device of claim 13, wherein the license comprises:

an action that the requesting device is permitted to take; and a condition associated with the permitted action.

15. The computing device of claim 13, wherein the instructions stored in the memory are further executable to:

determine permitted actions based on input received from a user of the computing device and restrictions received from an entity other than the user of the computing device; and determine conditions associated with the permitted actions based on the input and the restrictions.

16. The computing device of claim 13, wherein the requesting device comprises an electronic book reader and the digital media comprises an electronic book.

17. The computing device of claim 13, wherein the instructions stored in the memory are further executable to receive a fee from the requesting device before transmitting the token to the requesting device.

18. A server that is configured to facilitate sharing of digital media, comprising:

a processor;

memory in electronic communication with the processor;

instructions stored in the memory, the instructions being executable to:

maintain a borrowing list that specifies an order of multiple digital media that a user of a first computing device requests to borrow;

receive a request for a first digital media in the borrowing list, wherein the request is received from the first computing device;

generate a license for the first digital media, wherein the license comprises an action that the first computing device is permitted to take with respect to the first digital media and a condition associated with the permitted action, and the license is based in part on input from a user of a second computing device that is lending the first digital media and based in part on restrictions from an entity other than the users of the first and second computing devices;

determine, as part of generating the license, permitted actions based on the input from the user of the second computing device and restrictions associated with the first digital media from the entity other than the user of the second computing device;

determine, as part of generating the license, conditions associated with the permitted actions based on the input and the restrictions;

transmit a copy of the first digital media and the license for the first digital media to the first computing device; and automatically transmit a copy of a second digital media from the borrowing list and a license for the second digital media when the license for the first digital media indicates that the first digital media is no longer useable on the first computing device.

19. The server of claim 18, wherein the license is implemented as a token that is required to access to the first digital media.

20. A server configured to facilitate sharing of digital media, comprising:

a processor;

memory in electronic communication with the processor;

instructions stored in the memory, the instructions being executable to:

maintain a waiting list corresponding to a digital media item, the waiting list including an ordered list of users that have requested to receive a copy of the digital media item;

generate a license for the digital media item, wherein the license comprises an action that the computing device is permitted to take regarding consumption of the digital media item and a condition that, when satisfied, allows the permitted action, and the license is based in part on input from a user that is lending the digital media item and based in part on restrictions from an entity other than the user that is lending the digital media item;

provide a copy of the digital media item and the license to a computing device of a first user on the waiting list;

provide the copy of the digital media item to a second user on the waiting list when the license for the digital media item indicates that the computing device of the first user is no longer authorized to use the digital media item; and enforce the license by determining whether a user-requested action is permitted and determining whether one or more conditions associated with the action are satisfied.

21. The server of claim 20, wherein the license is implemented as a token that is required to access to the digital media item and user devices of the users in the waiting list are prevented from displaying the digital media item without the token.

* * * * *